United States Patent Office 3,479,416
Patented Nov. 18, 1969

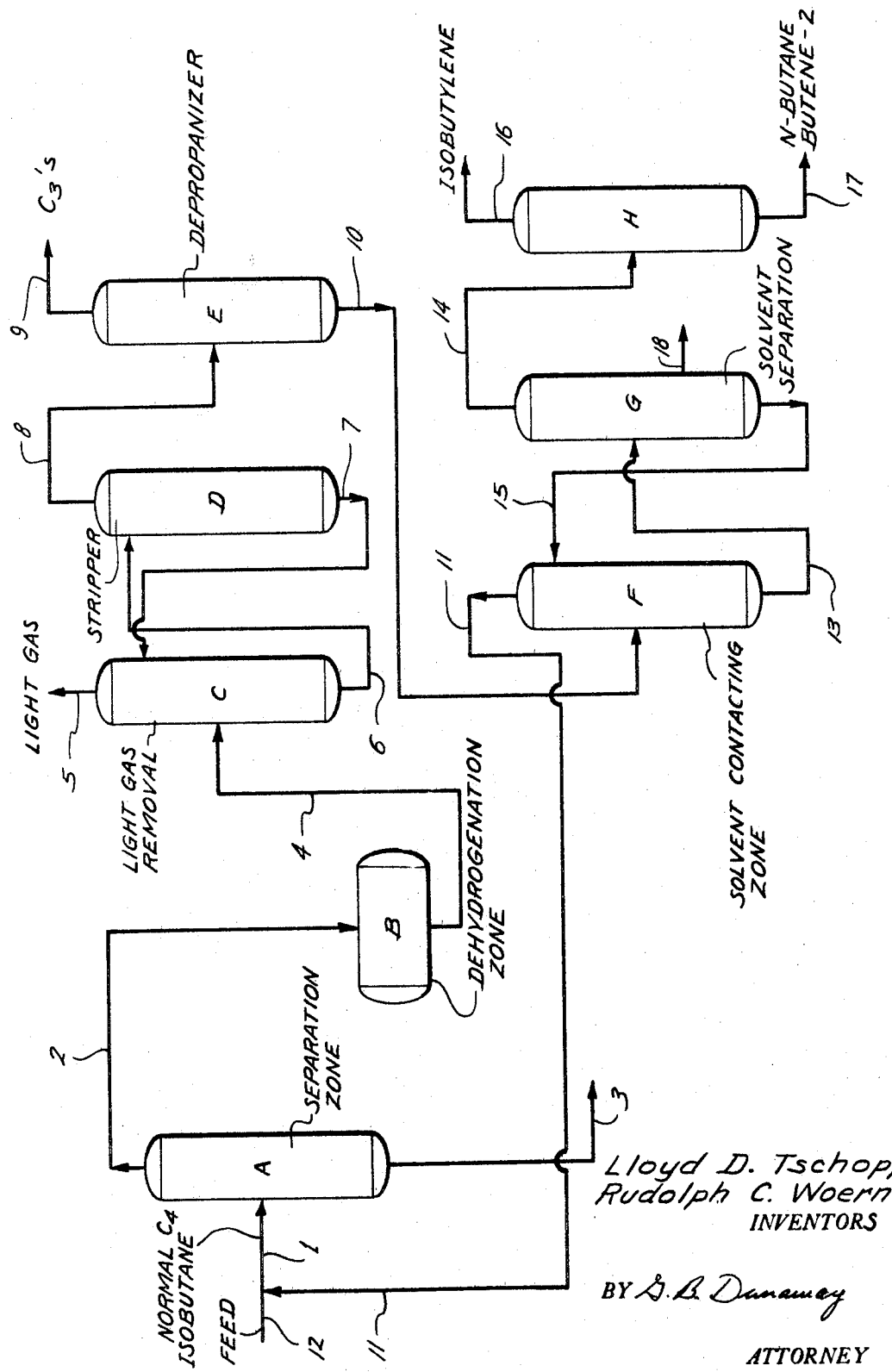

3,479,416
PRODUCTION OF ISOBUTYLENE
FROM ISOBUTANE
Lloyd D. Tschopp, Humble, and Rudolph C. Woerner,
Houston, Tex., assignors to Petro-Tex Chemical Corporation, Houston, Tex., a corporation of Delaware
Filed May 19, 1967, Ser. No. 640,096
Int. Cl. C07c 5/18, 11/08
U.S. Cl. 260—683.3         7 Claims

ABSTRACT OF THE DISCLOSURE

In an integrated process for dehydrogenation of isobutane to prepare high-purity isobutylene containing a minimum of the inseparable butene-1, the fresh feed (and recycled isobutane if necessary) is distilled to remove nearly all the n-butane and higher boiling constituents. Reactor effluent contains more straight-chain $C_4$ than feed due to some isomerization (and limited cracking) in reactor, but should contain less than 2.5 mols (preferably less than 0.004 mol) butene-1 per 100 mols of isobutylene. The butylenes content of effluent is separated from unreacted butanes in a selective solvent such as furfural, usually after removal of the $H_2$-$C_3$ gases. Diolefin acetylenes content of the isobutylene product may be minimized by taking off butadiene etc. as a side stream from the solvent stripping tower. For 99% isobutylene, product may be re-distilled to remove high boilers, n-butane and 2-butenes.

BACKGROUND OF THE INVENTION

Field of the invention

This application relates to the preparation of isobutylene, preferably of a high purity, from isobutane by an integrated process which includes feed preparation, dehydrogenation and purification steps.

Description of the prior art

Isobutylene of a high purity is used for diverse applications such as one of the comonomers for butyl rubber. Isobutylene is normally separated and segregated from $C_4$ hydrocarbon fractions, obtained as petroleum process by-products and the like, by treating a $C_4$ hydrocarbon stream containing isobutylene with polybasic mineral acids, particularly sulfuric acid in the range of about 55 to 70 weight percent. When the $C_4$ hydrocarbon stream containing isobutylene is passed into the concentrated sulfuric acid, the isobutylene is selectively absorbed by the sulfuric acid. At the same time, small amounts of other $C_4$ hydrocarbons such as isobutane, butenes, n-butane and the like are also absorbed in the acid. Normally, the sulfuric acid containing dissolved or entrained therein a portion of the $C_4$ hydrocarbon stream as described, is first weathered, diluted and then heated to release a substantial proportion of the absorbed isobutylene. Under the process conditions as described, the purity of the isobutylene so produced may contain isobutane and butene-1 as the major impurities.

Isobutylene of a purity greater than about 99 percent produced by a simplified process is desired for making industrial chemical derivatives and polymers therefrom. A number of procedures have been proposed to increase the purity of isobutylene produced substantially as described. These methods include vacuum stripping of the sulfuric acid extract, passing gases through the sulfuric acid extract in an attempt to physically blow out the undesirable impurities, fractional distillation of the isobutylene product liberated from the sulfuric acid and the like. With a combination of steps, high purity isobutylene may be achieved. Nevertheless, a distinct disadvantage of these processes is that a considerable percentage of the isobutylene is lost due to polymerization particularly during the release of the isobutylene from the sulfuric acid. Another disadvantage of these prior art processes is that the quantity of isobutylene so obtained is limited by the supply of the by-product streams available to be treated. Still another drawback of such a process is the high capital cost of an acid extraction plant.

An alternate route to produce isobutylene is desired. One possibility is by the dehydrogenation of isobutane. Relatively low purity isobutane is fairly readily available as a petroleum by-product. However, the recovery and purification of isobutylene produced by the dehydrogenation of isobutane can involve the same described sulfuric acid extraction process and the attendant disadvantages.

It is therefore an object of this invention to provide a process that is capable of producing high purity isobutylene from hydrocarbon stream comprising predominately isobutane. It is another object to produce isobutylene by a process which requires relatively low capital investment and which does not suffer from the disadvantages associated with processes for the sulfuric acid extraction of isobutylene from hydrocarbons. Still another object of this invention is to provide a process for the simultaneous production of isobutylene and butadiene-1,3 from a predominately isobutane hydrocarbon feed stream. These and other objects are accomplished by the invention described herein.

SUMMARY OF THE INVENTION

Accordingly to this invention a process is provided for the production of isobutylene which comprises feeding a hydrocarbon mixture comprising predominately isobutane and normal or straight chain four carbon hydrocarbons to a separation zone wherein straight chain four-carbon hydrocarbons are separated from isobutane to provide a hydrocarbon stream from the first separation zone having at least 50 weight percent isobutane, reacting said hydrocarbon stream from the first separation in a dehydrogenation reactor to form a reactor effluent comprising isobutane, isobutylene and straight chain four carbon hydrocarbons with n-butene-1 constituting from .0001 to .025 mol of n-butene-1 per mol of isobutylene in the reactor effluent, the straight chain four carbon hydrocarbons in the reactor effluent being present in an amount greater than the weight percent of straight chain four carbon hydrocarbons fed to the said reactor, contacting the said reactor effluent in a solvent contacting zone with a solvent which selectively dissolves isobutylene in preference to normal butane and isobutane, taking from said solvent contacting zone a hydrocarbon stream comprising straight chain four carbon hydrocarbons and isobutane and feeding said hydrocarbon stream to said separation zone, taking from said solvent contacting zone a solution comprising isobutylene and solvent and separating isobutylene product from said solution. A preferred feature of the invention is the process where butadiene-1,3 is taken off as a side stream from the step wherein isobutylene is separated from the said solution.

BRIEF DESCRIPTION OF THE DRAWING

One preferred method of conducting the process of this invention is illustrated in the drawing. An organic stream comprising predominantly isobutane and straight chain four-carbon hydrocarbons is fed to the separation zone A. From this separation zone is taken a stream 2 having at least 50 weight percent isobutane and a minor weight percent of straight chain four carbon hydrocarbons. In dehydrogenation zone B this stream is dehydrogenated to form a reactor effluent comprising isobutane, isobutylene and straight chain four carbon hydrocarbons including n-butene-1 in a particular composition. In the dehydrogenation zone B some isobutane is converted to straight chain four carbon hydrocarbons. Zones C, D and E are utilized to separate gases lighter than $C_4$ hydrocarbons. Zone F is a solvent contacting zone with the undissolved gases being returned as a liquid or gas to the feed to zone A. The dissolved gases and solvent 13 are taken to a solvent separation zone G, the solvent is returned to zone F and isobutylene containing stream 14 is separated. This stream 14 may be used as such or further purified such as in zone H to separate n-butane and butene-2. A preferred embodiment of this invention is illustrated by taking a butadiene-containing stream 18 as a side stream from the solvent separation zone G. This butadiene containing stream may be utilized as such or further separated by means not shown.

DESCRIPTION OF THE PREFERRED EMBODIMENT(S)

In order that those skilled in the art may more fully appreciate the nature of the invention and a method for carrying it out, it will be more specifically described in connection with the accompanying drawing which is a flow sheet of one form of the invention. The process will be illustrated by the use of particular pieces of equipment, but it is understood that a single piece of equipment may be separated into several pieces of equipment so long as the same result is achieved or conversely several pieces of equipment may be combined. Conventional auxiliary equipment such as pumps, heating and cooling means, compressors, etc., have not been shown as this type of equipment is well known to those skilled in the art.

The feed 1 to the separation zone A will comprise predominantly isobutane and straight chain $C_4$ hydrocarbons. This feed stream will normally be a hydrocarbon stream and may contain other components such as hydrocarbons of 2, 3, 5, 6, etc. carbon atoms. However, the stream should still constitute predominantly four carbon hydrocarbons, and will preferably contain no greater than 40 weight percent straight chain four carbon hydrocarbons. The separation zone A may be a fractional distillation tower and may contain plates or packing. In the separation zone A straight chain four carbon hydrocarbons are separated from isobutane and are removed as a bottoms 3. For example, n-butane is separated from the isobutane. The overhead stream 2 will contain at least fifty weight percent isobutane (and preferably at least 67 weight percent isobutane based on hydrocarbons heavier than propane) and may also contain a minor weight percent of straight chain four carbon hydrocarbons, preferably no greater than 1.0 weight percent.

In the dehydrogenation zone B isobutane is dehydrogenated to isobutylene. In the dehydrogenation zone also at least a portion of the isobutane is converted to straight chain $C_4$ hydrocarbons. The mechanism for this conversion is difficult to determine. For instance, isobutane may first be isomerized to n-butane which in turn may be partially dehydrogenated to normal butene, or isobutane may be first dehydrogenated to isobutylene which is then isomerized to n-butene. At any rate, the net effect is that some of the isobutane is converted to n-butene and n-butane. As a preferred embodiment from .1 to 1.5 or 3 mols of straight chain four carbon hydrocarbons are produced per 100 mols of isobutylene produced in the dehydrogenation zone. Also, in the dehydrogenation zone a portion of butadiene-1,3 is produced. This may be produced either from n-butane or n-butene which is fed to the dehydrogenation zone or formed in the dehydrogenation zone from other components. The dehydrogenation zone effluent 4 contains a variety of products with isobutylene being a relatively major component. The dehydrogenation zone feed, reaction conditions, catalyst, etc. are regulated such that the n-butene-1 is maintained within the range of from .0001 to .025 mol of n-butene-1 per mol of isobutylene in the reactor effluent and preferably no greater than .010 mol of n-butene-1 per mol of isobutylene. Any catalyst and reaction conditions may be employed so long as the described conditions are met. The catalyst in the dehydrogenation zone may be, e.g., alumina or an oxide derived from metals of Groups IV$b$, V$b$ or VI$b$ of the Periodic Chart of the elements (e.g., Ti, Zr, Hf, V, Nb, Ta, Cr, Mo, W or mixtures thereof). The mentioned metal oxides are preferably deposited on a suitable support such as, for example, silica, silica-alumina, alumina, etc. Usually the oxides of chromium, molybdenum and vanadium deposited on alumina or magnesia are preferred as the dehydrogenation catalysts. Specific examples of such catalysts are alumina promoted with 40 percent chromium oxide, alumina promoted with 40 percent zirconium oxide, alumina promoted with 40 percent titanium dioxide, alumina promoted with 40 percent tin oxide, magnesia promoted with 20 percent molybdenum oxide, magnesia promoted with 40 percent zirconium oxide, magnesia-alumina promoted with 20 percent vanadium oxide, unsupported active chromium oxide. The preferred catalysts will contain from about 20 percent to about 30 percent by weight of the catalytic oxide of Groups IV$b$, V$b$ or VI$b$ of the Periodic Table (Periodic Table as found on page 881 of Van Nostrand Encyclopedia of Chemical Science, 1964) supported on alumina. Although a fluid bed may be employed, the catalyst will suitably be in the form of a fixed bed.

The temperature in the dehydrogenation zone will generally be within the range of about 900° to about 1200° F. The contact time and space velocity may be varied depending on other conditions with ranges such as from 0.01 minute to about 15 minutes depending upon the type of reactor utilized. Suitable space velocities are such as from about 1 to 10 liquid hourly space velocity. Pressure is not a critical variable and the process can be operated at atmosphere, subatmosphere or super atmosphere pressure. However, the use of subatmospheric pressure results in increased yields and pressures such as from about two to eight p.s.i.a. may be employed.

The effluent 4 from the dehydrogenation zone is cooled by means known to those skilled in the art such as by the use of quench, waste heat, boilers, condensers and the like. These gases are then generally compressed prior to further treatment. Zones C, D and E represent means for separating gases lighter than four carbon hydrocarbons. In these zones light gases such as CO, $CO_2$, hydrogen, methane, ethane, propane, propylene and the like are separated. A preferred method for separating these gases is set forth in the drawing. Zone C is illustrated by an absorber tower wherein a split is made between $C_3$ hydrocarbons and $C_2$ and lighter gases. A reboiler may suitably be employed in the absorber to achieve the desired split between $C_3$ and the $C_2$ and lighter gases. The light gases 5 constitute primarily hydrogen, CO, $CO_2$, methane, ethane and ethylene. These gases may suitably be disposed of such as by burning in a boiler. However, it is sometimes advantageous to use a portion of these gases as purge gases. This is true if the dehydrogenation zone B is a cyclic type of operation wherein purge gas is employed. This purge gas may be used to purge the gas after the cycle wherein coke is burned from the catalyst. Zone C may be a conventional oil absorber and may be operated in a normal manner to achieve the desired separation. Suitable absorber oils are such as paraffinic oils. The $C_4$ hydrocarbons are absorbed in the absorber oil and taken from the absorber as stream 6 and fed to the stripper D. Absorber oil is returned to the absorber as stream 7. The stripper D is also a conventional piece of equipment wherein the absorbed $C_4$ hydrocarbons are separated from the absorber oil. The $C_3$ and $C_4$ hydrocarbons leave the stream 8 and are fed to a depropanizer E. In the depropanizer $C_3$ hydrocarbons are taken off as an overhead 9 and recovered. This overhead will constitute primarily propylene and propane. The depropanizer may be a packed or plate type of fractional distillation tower. The described combination of absorber, stripper and depropanizer is the preferred embodiment according to this invention. However, other schemes may be employed such as elimination of the depropanizer or the operation of the absorber such that the split is primarily made between $C_3$ and $C_4$ hydrocarbons. Even if a $C_3$-$C_4$ split is made in the absorber, a depropanizer may still be useful to separate residual $C_3$'s from the $C_4$ stream 9.

The stream 10 will comprise mainly $C_4$ and heavier hydrocarbons and isobutylene will be a major component. According to this invention, quantity of n-butene-1 will still be within the range of from .0001 to .025 mol of n-butene per mol of isobutylene in stream 10. Stream 10 is fed to a solvent contacting zone F. Zone F will preferably be an extractive distillation column but liquid-liquid extraction can satisfactorily be employed under certain conditions. The drawing illustrates the use of an extractive distillation column as the solvent contacting zone F. In zone F the stream 10 is contacted with a solvent which selectively dissolves isobutylene in favor of e.g., isobutane and n-butane. The undissolved hydrocarbon fraction is taken off as stream 11 and recycled as stream 11 to the separation zone A. This stream 11 may suitably comprise from .0025 to 6, preferably from .005 to 1, weight percent straight chain four carbon hydrocarbons and at least 70 weight percent isobutane. Additional feed 12 from any source is also fed to the separation zone A such that the feed 1 to the separation zone is as described above.

The solvent employed in zone F can be any solvent known to those skilled in the art to make the described separation between isobutylene and saturated $C_4$ hydrocarbons. A particularly preferred solvent is furfural or a furfural mixture containing water in an amount of up to 25 percent by weight of the total furfural-water mixture. Other satisfactory solvents are such as acetone, acetonitrile, dimethyl formamide, dimethyl sulphoxide, N-methyl pyrrolidone, methyl ethyl ketone, mixtures of these solvents with water, and the like.

The solvent containing isobutylene dissolved therein, stream 13, is fed to a solvent separation zone G where the solvent is separated as stream 15 and returned to the solvent contacting zone F.

A preferred embodiment of this invention resides in the taking of a side stream 18 from the solvent separation column G. This sidestream is most satisfactorily taken at the point where there is a maximum concentration or bulge in the concentration of butadiene-1,3. Stream 14 is the isobutylene stream and may be of sufficiently high purity that additional purification is not required. Nevertheless, it is another feature of this invention that the isobutylene may be further purified by separating n-butane and the various butene-2 isomers in a fractional distillation column H. High purity isobutylene 16 is taken as a product. It is also possible to make other separations in the area of zones G and H such as feeding stream 14 to a distillation column to separate water and perhaps some hydrocarbons from the stream prior to feeding to the final distillation column H.

Another preferred embodiment of this invention is the feeding of the stream 11 to the separation zone A as a separate stream to a fractional distillation tower as the separation zone A. That is, the stream 11 is not mixed with feed 12. A preferred location of this feed is at a point higher in the tower than the stream 12.

Still another preferred embodiment is to feed fresh solvent, e.g. from stream 15, into solvent separation zone G at a point above the point of taking off sidestream 18. By such a procedure an enriching section is provided for more efficient removal of vinyl acetylene.

EXAMPLE

A specific example of the invention will now be illustrated. Reference is made to the drawing. All percentages are liquid volume percentages unless stated otherwise. The separation zone A is a fractional distillation column and composition 1 is a hydrocarbon stream containing 96.45 percent isobutane, 0.88 percent isobutylene and 2.67 percent n-butane. The bottoms 3 contains 4.5 percent isobutane and 95.5 percent n-butane. The overhead 2 consists of 98.9 percent isobutane, 0.9 percent isobutylene and 0.2 percent n-butane. This composition is fed to dehydrogenation zone B which is a Houdry type cyclic reactor employing a chromia-alumina catalyst. The reactor is operated at a pressure of about 2.0 p.s.i.a. and the maximum temperature during dehydrogenation is about 1100° F. The conversion of isobutane is 50 mol percent. In the dehydrogenation zone isobutane is dehydrogenated to isobutylene and butadiene-1,3 and n-butene-1 and n-butene-2 are formed. Some straight chain $C_4$ hydrocarbons are formed from the iso $C_4$ hydrocarbons. Conventional cooling means such as waste heat boilers, quenching and condensers are employed. The composition is compressed and fed to zone C which is an oil absorber employing a paraffinic absorber oil having a boiling point range of about 240 to 390° F. Light gases are taken off at 5 and the fat oil 6 is fed to the stripper column D. Stripped absorber oil 7 is returned to the absorber. The stripped gases 8 are fed to the depropanizer E where $C_3$ hydrocarbons are taken off as steam 9. The remaining composition 10 is used as a feed to the solvent tower F. This feed contains approximately 53.5 percent isobutane, 45.9 percent isobutylene, 0.1 percent n-butene-1, 0.2 percent n-butane together with minor portions of butadiene-1,3 and butene-2. The solvent tower F utilizes a furfural-water mixture containing 7 percent water by weight as a solvent. The overhead 11 from the solvent tower contains 97.9 percent isobutane, 1.8 percent isobutylene and 0.3 percent n-butane. This composition is fed to the stream entering the fractional distillation tower A. The fat solvent 13 is fed to a stripper G with a stripper overhead containing 0.21 percent isobutane, 98.9 percent isobutylene, 0.21 percene n-butene 1, 0.05 percent butadiene, 0.15 percent n-butane, 0.26 percent butene-2 low and 0.21 percent butene-2 high. A butadiene containing side stream 18 is taken from the stripper and sent for further purification. The stripper overhead 14 is fed to the fractional distillation column H. The isobutylene product overhead 16 contains 99.45 percent isobutylene with the impurities being minor amounts of isobutane, butene-1, butadiene and butene-2. In the fractional distillation column H a stream containing n-butane, isobutylene and butene-2 is taken off as a bottoms 17.

We claim:

1. A process for the production of isobutylene which comprises feeding a hydrocarbon mixture comprising predominately isobutane and straight chain four carbon hydrocarbons to a separation zone wherein straight chain four carbons hydrocarbons are separated from isobutane to provide a hydrocarbon stream from the first separation zone having at least 50 weight percent isobutane and a minor weight percent of straight chain four carbon hydrocarbons, reacting said hydrocarbon stream from the first separation in a dehydrogenation reactor to form a reactor effluent comprising isobutane, isobutylene and straight chain four carbon hydrocarbons with n-butene-1 consistuting from .0001 to .025 mol of n-butene-1 per mol of isobutylene in the reactor effluent, the straight chain four carbon hydrocarbons in the reactor effluent being present in an amount greater than the weight percent of straight chain four carbon hydrocarbons fed to the said reactor, contacting the said reactor effluent in a solvent contacting zone with a solvent which selectively dissolves isobutylene in preference to n-butene and isobutane, taking from said solvent contacting zone a hydrocarbon stream comprising straight chain four carbon hydrocarbons and isobutane and feeding said hydrocarbon stream to said separation zone, taking from said solvent contacting zone a solution comprising isobutylene and solvent and separating isobutylene product from said solution.

2. The process according to claim 1 wherein a major portion of the gases having a boiling point lower than four carbon hydrocarbons are separated from the said reactor effluent prior to contacting the reactor effluent with the said solvent in the solvent contacting zone.

3. The process according to claim 1 wherein the said solvent comprises a member selected from the group consisting of acetone, acetonitrile, dimethyl formamide, dimethyl sulfoxide, furfural, n-methyl pyrrolidone, methyl ethyl ketone and mixtures thereof with water.

4. The process of claim 1 wherein the isobutylene is separated from the said solution in a stripping tower and a butadiene-1,3 containing stream is taken off as a side stream from the stripping tower.

5. The process of claim 1 wherein the isobutylene separated from said solution is fractionated to separate n-butane and butene-2 from the isobutylene.

6. A process for the production of high purity isobutylene which comprises feeding a predominately isobutane hydrocarbon mixture having based on the total hydrocarbon stream of no greater than 40 weight percent straight chain four carbon hydrocarbons to a separation zone wherein straight chain four carbon hydrocarbons are separated from isobutane to provide a hydrocarbon stream from the the first separation zone having at least 67 weight percent isobutane based on the hydrocarbons heavier than propane and no greater than 1.0 weight percent straight chain four carbon hydrocarbons, reacting said hydrocarbon stream from the first separation in a dehydrogenation reactor to form a reactor effluent comprising isobutane, isobutylene, and straight chain four carbon hydrocarbons with n-butene-1 constituting from .0001 to .010 mol of n-butene-1 mol of isobutylene in the reactor effluent, and producing from .1 to 3 mols of straight chain four carbon hydrocarbons per 100 mols of isobutylene produced in the said reactor, contacting the said reactor effluent in a solvent contacting zone with a solvent which selectively dissolves isobutylene in preference to n-butane and isobutane, taking from said solvent contacting zone an undissolved hydrocarbon stream comprising from .0025 to 6 weight percent straight chain four carbon hydrocarbons and at least 70 weight percent isobutane and feeding said hydrocarbon stream to said separation zone, taking from said solvent contacting zone a solution comprising isobutylene and solvent and separating isobutylene product from said solution.

7. A process for the production of isobutylene having a purity of at least 99 weight percent isobutylene which comprises feeding a hydrocarbon mixture having based on the total hydrocarbon stream of no greater than 20 weight percent normal four carbon hydrocarbons including n-butane and at least 70 weight percent isobutane to a fractional distillation tower wherein straight chain four-carbon hydrocarbons including n-butane are separated from isobutane to provide a hydrocarbon stream from the fractional distillation tower having at least 67 weight percent isobutane based on the hydrocarbons heavier than propane and no greater than .6 weight percent straight chain four carbon hydrocarbons, dehydrogenating said hydrocarbon stream from the fractional distillation zone with a catalyst comprising chromium oxide to form a dehydrogenation zone effluent comprising isobutane, isobutylene and straight chain four carbon hydrocarbons with n-butene-1 constituting from .0001 to .004 mol of n-butene-1 per mol of isobutylene in the dehydrogenation zone effluent and in the dehydrogenation zone from about 0.1 to 1.5 mols of straight chain four carbon hydrocarbons being produced per 100 mols of isobutylene produced, contacting the dehydrogenation zone effluent in a light gas removal zone to separate gases having a boiling point lower than hydrocarbons of four carbon atoms and to dissolve four carbon hydrocarbons in an absorber oil, stripping the absorber oil of four carbon hydrocarbons as a stripper overhead, contacting the said stripper overhead in a solvent contacting zone with a solvent which selectively dissolves isobutylene in preference to n-butene and isobutane, taking from said solvent contacting zone an undissolved gaseous hydrocarbon stream comprising from .005 to 1 weight percent staright chain four carbon hydrocarbons and at least 70 weight percent isobutane and feeding said gaseous hydrocarbon stream to said fractional distillation tower, taking from said solvent contacting zone a solution comprising isobutylene and solvent and separating isobutylene from said solution by stripping, and fractionally distilling the separated isobutylene to remove n-butane and butene-2.

References Cited

UNITED STATES PATENTS

| | | | |
|---|---|---|---|
| 3,293,316 | 12/1966 | Clay | 260—681.5 |
| 3,293,319 | 12/1966 | Haensel et al. | 260—683.3 |
| 3,317,627 | 5/1967 | King et al. | 260—681.5 |
| 3,320,138 | 5/1967 | Brandt et al. | 203—58 |
| 3,235,471 | 2/1966 | Clay | 203—54 |
| 2,956,092 | 10/1960 | Craig | 260—680 |

DELBERT E. GANTZ, Primary Examiner

G. E. SCHMITKONS, Assistant Examiner

U.S. Cl. X.R.

203—57, 58; 260—681.5

PO-1050
(5/69)

UNITED STATES PATENT OFFICE
CERTIFICATE OF CORRECTION

Patent No. 3,479,416    Dated January 28, 1970

Inventor(s) Lloyd D. Tschopp and Rudolph C. Woerner

It is certified that error appears in the above-identified patent and that said Letters Patent are hereby corrected as shown below:

Col. 5, line 14, after "," insert --- the ---.

Col. 6, line 39, second occurrence, "percene" should read --- percent -

Col. 6, line 71, delete "n-butene" and insert therefor --- n-butane ---.

Col. 8, line 26, delete "n-butene" and insert therefor --- n-butane ---.

SIGNED AND
SEALED
JUN 23 1970

(SEAL)
Attest:

Edward M. Fletcher, Jr.
Attesting Officer

WILLIAM E. SCHUYLER, JR.
Commissioner of Patents